(12) United States Patent
Ichikawa

(10) Patent No.: US 11,745,586 B2
(45) Date of Patent: Sep. 5, 2023

(54) VEHICLE DISPLAY DEVICE

(71) Applicant: Yazaki Corporation, Tokyo (JP)

(72) Inventor: Junichi Ichikawa, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 99 days.

(21) Appl. No.: 17/412,369

(22) Filed: Aug. 26, 2021

(65) Prior Publication Data

US 2022/0072955 A1  Mar. 10, 2022

(30) Foreign Application Priority Data

Sep. 8, 2020 (JP) ................................. 2020-150196

(51) Int. Cl.
  *B60K 35/00* (2006.01)
  *G02B 27/01* (2006.01)

(52) U.S. Cl.
  CPC ...... *B60K 35/00* (2013.01); *B60K 2370/1529* (2019.05); *B60K 2370/23* (2019.05); *G02B 27/01* (2013.01)

(58) Field of Classification Search
  CPC ........... G02B 27/01–0189; G02B 6/00–12033; G02B 2027/0105–0198; G03B 21/28; G03B 21/2066
  See application file for complete search history.

(56) References Cited

U.S. PATENT DOCUMENTS

| | | | |
|---|---|---|---|
| 2017/0315351 A1* | 11/2017 | Yamazoe | G02B 1/11 |
| 2019/0146218 A1 | 5/2019 | Yamazoe et al. | |
| 2022/0214542 A1* | 7/2022 | Fang | G02F 1/133528 |

FOREIGN PATENT DOCUMENTS

| | | |
|---|---|---|
| JP | 2017-173557 A | 9/2017 |
| WO | 2017/195741 A1 | 11/2017 |

* cited by examiner

*Primary Examiner* — Bao-Luan Q Le
*Assistant Examiner* — Christopher A Lamb, II
(74) *Attorney, Agent, or Firm* — Sughrue Mion, PLLC

(57) ABSTRACT

A vehicle display device includes: an optical system that makes display light emitted from an emission unit cross along an intersecting direction intersecting with an optical axis direction of the display light, and then reflects the display light on a display surface provided to a vehicle toward an eye point that is assumed in advance; a light-blocking wall provided to face an optical path of the display light and including a narrowing part that narrows the optical path toward a cross point of the display light along the intersecting direction; and a partial cutoff adjustment structure that partially cuts off a display image by the display light at a portion other than the narrowing part when the eye point moves along the intersecting direction.

16 Claims, 7 Drawing Sheets

VEHICLE DISPLAY DEVICE

CROSS-REFERENCE TO RELATED APPLICATION(S)

The present application claims priority to and incorporates by reference the entire contents of Japanese Patent Application No. 2020-150196 filed in Japan on Sep. 8, 2020.

BACKGROUND OF THE INVENTION

1. Field of the Invention

The present invention relates to a vehicle display device.

2. Description of the Related Art

One example of the conventional vehicle display devices applicable to vehicles is a head-up display device disclosed in Japanese Patent Application Laid-open No. 2017-173557. This head-up display device includes a display unit that emits display light, a first mirror that reflects the display light emitted from the display unit, a second mirror that reflects the display light reflected on the first mirror, and a case that houses the display unit, the first mirror, and the second mirror. The first mirror is a first concave mirror with a curvature that makes the reflected display light cross vertically before the display light reaches the second mirror. The second mirror is a second concave mirror that reflects the received display light. The case includes a first shielding part and a second shielding part that extend to the vicinity of a cross point where the light crosses so as to have an optical path between the first and second concave mirrors therebetween, and a transmission member that transmits visible light and reflects infrared light at an opening to become the optical path between the first shielding part and the second shielding part.

Incidentally, for example, the head-up display device as described above has room for improvement about the partial cutoff of a display image by the display light.

SUMMARY OF THE INVENTION

The present invention has been made in view of the above circumstances, and an object is to provide a vehicle display device capable of suitable display.

To achieve the above objection, a vehicle display device according to one aspect of the invention includes an emission unit that is mounted on a vehicle and emits display light; an optical system that makes the display light emitted from the emission unit cross along an intersecting direction intersecting with an optical axis direction of the display light, and then reflects the display light on a display surface provided to the vehicle toward an eye point that is assumed in advance; a light-blocking wall provided to face an optical path of the display light and including a narrowing part that narrows the optical path toward a cross point of the display light along the intersecting direction; and a partial cutoff adjustment structure that partially cuts off a display image by the display light at a portion other than the narrowing part when the eye point moves along the intersecting direction.

According to another aspect of the present invention, in the vehicle display device, the partial cutoff adjustment structure may include a partial cutoff wall part provided to the light-blocking wall.

According to still another aspect of the present invention, in the vehicle display device, the optical system may include a reflection mirror that reflects the display light emitted from the emission unit, and the partial cutoff adjustment structure may include a partial cutoff wall part provided to the reflection mirror.

According to still another aspect of the present invention, in the vehicle display device, the optical system may include a reflection mirror that reflects the display light emitted from the emission unit, and the partial cutoff adjustment structure may include a partial cutoff end that is an end of the reflection mirror in the intersecting direction.

According to still another aspect of the present invention, in the vehicle display device, the partial cutoff adjustment structure may be provided to the reflection mirror that finally reflects toward the display surface, the display light that is emitted from the emission unit and crosses in the intersecting direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of the present invention are hereinafter described in detail with reference to the drawings. Note that the present invention is not limited by the embodiments. In addition, the components in the following embodiments include the component that a person skilled in the art can replace or conceive easily, or substantially the same component.

First Embodiment

Figure 1:
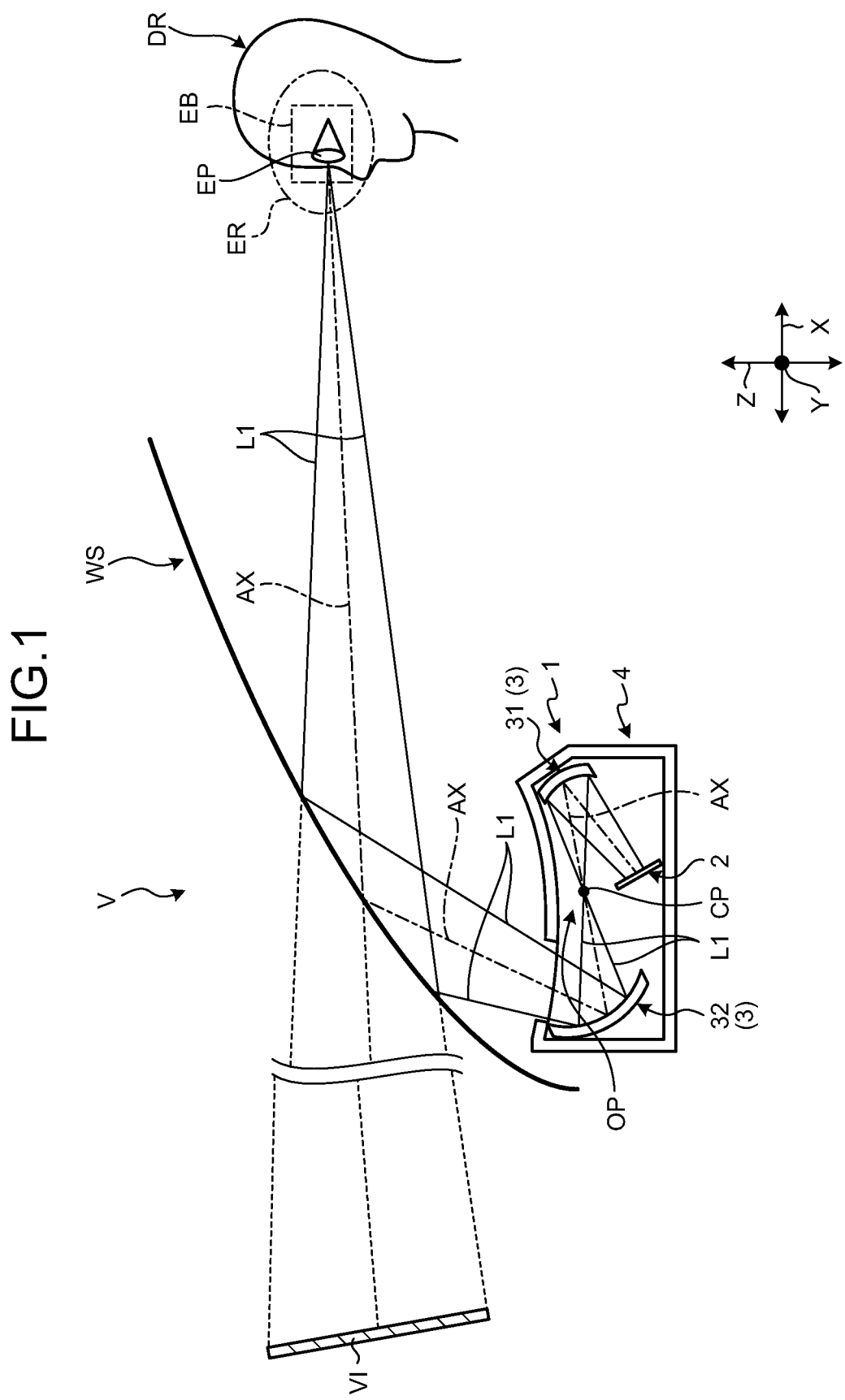
FIG. 1 is a schematic cross-sectional view illustrating a schematic structure of a vehicle display device according to a first embodiment.

A vehicle display device 1 according to the present embodiment illustrated in FIG. 1 is used for a vehicle V, and forms what is called a head-up display (HUD). The vehicle display device 1 is mounted in an instrument panel provided to a dashboard of the vehicle V, for example. The vehicle display device 1 is to emit display light L1 to a windshield WS or the like of the vehicle V and provide various pieces of visible information to a driver DR or the like with a display image VI that reflects on the windshield WS toward an eyepoint EP. The vehicle display device 1 displays the vehicle information about the vehicle V with the display image VI reflecting on the windshield WS in a manner that the vehicle information is visible at the eyepoint EP.

Here, it is assumed in advance that the eyepoint EP typically exists in an eye box EB that is set in what is called an eye range ER in the vehicle V. The eye range ER is "eye range of a driver of an automobile", and corresponds to a region where the viewpoint of the driver DR who is determined in advance in accordance with the vehicle V exists. The eye range ER is typically the range statistically expressing the distribution of the eye positions of the driver DR in the vehicle V, and for example corresponds to the region including the eye positions of the driver DR who is seated in the driver's seat at a predetermined ratio (for example, 95%). It is assumed in advance that the eye box EB exists in the eye range ER, and is the spatial region where the driver DR driving in the driver's seat can see the display image VI properly.

In addition, in the vehicle V, the windshield WS forms a display surface for reflecting the display light L1 emitted from the vehicle display device 1 toward the eyepoint EP. The windshield WS is a transmission member with a light-transmitting property that transmits at least light with a visible light region component (visible light ray). Here, the light with the visible light region component is the light whose wavelength component is in the visible light region that can be recognized by humans, and for example is the light with a component whose wavelength ranges from 360 nm to 830 nm.

The vehicle display device 1 according to the present embodiment has a smaller size because the display light L1 crosses in a direction intersecting with the optical axis direction along an optical axis AX in an optical path OP of the display light L1. In this structure, the vehicle display device 1 according to the present embodiment suppresses the disturbance of the partial cutoff of the display image VI with a partial cutoff adjustment structure 6 (see FIG. 2) so as to solve the contradiction that occurs due to the crossing of the display light L1 as described above, and thus, the suitable display is performed. The structure of the vehicle display device 1 is described below in detail with reference to each drawing.

In the description below, "vehicle front-rear direction X" of the vehicle V in which the vehicle display device 1 is used typically corresponds to the entire length direction of the vehicle V, and moreover corresponds to the direction along a direction where the vehicle V goes straight longitudinally. "Vehicle width direction Y" typically corresponds to the entire width direction of the vehicle V and corresponds to the vehicle left-right direction of the vehicle V. "Vehicle height direction Z" typically corresponds to the vehicle height direction of the vehicle V. The vehicle front-rear direction X corresponding to a first direction, the vehicle width direction Y corresponding to a second direction, and the vehicle height direction Z corresponding to a third direction are orthogonal to each other. In a state where the vehicle V exists on a horizontal surface, the vehicle front-rear direction X and the vehicle width direction Y extend along a horizontal direction and the vehicle height direction Z extends along a vertical direction. In the description below, moreover, the side where the vehicle V goes forward in the vehicle front-rear direction X may be referred to as "front side" and the side where the vehicle V goes backward in the vehicle front-rear direction X may be referred to as "rear side". In the vehicle width direction Y, the left side facing the front side in the vehicle front-rear direction X may be referred to as "left side" and the right side facing the front side in the vehicle front-rear direction X may be referred to as "right side". In the vehicle height direction Z, the upper side in the vertical direction may be referred to as "upper side" and the lower side in the vertical direction may be referred to as "lower side". The respective directions used in the description below express the directions in a state where the components are assembled together unless otherwise stated.

Specifically, the vehicle display device 1 according to the present embodiment is disposed on the lower side of the windshield WS in the vertical direction between the eye point EP and the windshield WS in the vehicle front-rear direction X. The vehicle display device 1 displays vehicle information about the vehicle V in a manner of emitting the display light L1 on the windshield WS, which forms the display surface, and displaying on the windshield WS, the display image VI by the display light L1 reflected on the windshield WS toward the eye point EP. The vehicle information to be displayed by the vehicle display device 1 may include, for example, the vehicle speed, the speed of a travel motive power source, the accumulated travel distance, the cooling water temperature, the amount of remaining fuel, the amount of remaining battery, various kinds of warning light, the shift position, the direction indicator, and the navigation information. Additionally, the vehicle information to be displayed by the vehicle display device 1 may include the caution object information around the vehicle V that is displayed overlapping with the background that is viewed through the windshield WS from the eye point EP (for example, information about pedestrian, peripheral vehicle, obstacle, and baggage).

More specifically, the vehicle display device 1 includes an emission unit 2, an optical system 3, and a housing 4. The vehicle display device 1 is unified in a manner that components including the emission unit 2 and the optical system 3 are housed in the housing 4, and is disposed on the lower side of the windshield WS in the vertical direction as described above. Then, the vehicle display device 1 displays the display image VI on the windshield WS in a manner that the display light L1 emitted from the emission unit 2 is delivered to the windshield WS through the optical system 3 and the display light L1 is reflected on the windshield WS toward the eye point EP.

The emission unit 2 is a display device that is mounted on the vehicle V and can emit the display light L1. The emission unit 2 is provided inside the housing 4. The display light L1 emitted from the emission unit 2 is the light expressing the display image VI to be displayed on the windshield WS, and includes at least light with a visible light region component. Examples of the emission unit 2 corresponding to the device emitting the display light L1 include a laser projector, a thin liquid crystal display, a plasma display, an organic EL display, a light indicator, and a vacuum fluorescent display. Here, the emission unit 2 is provided inside the housing 4, on the position at an approximately center in the vehicle front-rear direction X, and on the lower side in the vehicle height direction Z. The emission unit 2 is supported in the housing 4 so that the optical axis direction (direction along the optical axis AX) of the emitted display light L1 goes to the rear side in the vehicle front-rear direction X and to the upper side in the vehicle height direction Z, and emits (projects) the display light L1 to the rear side in the vehicle front-rear direction X and the upper side in the vehicle height direction Z.

The optical system 3 constitutes a part of an optical path optical system that forms the optical path OP of the display light L1 from the emission unit 2 to the eye point EP. The optical system 3 according to the present embodiment forms the optical path OP in which the display light L1, which is emitted from the emission unit 2, crosses along the intersecting direction intersecting with the optical axis direction of the display light L1 and then is reflected on the windshield WS that forms the display surface toward the eye point EP that is assumed in advance. The optical system 3 according to the present embodiment includes a first reflection mirror 31 and a second reflection mirror 32, and forms the optical path OP by the first reflection mirror 31 and the second reflection mirror 32.

The first reflection mirror 31 and the second reflection mirror 32 are optical elements that form an optical path changing optical system that changes the optical path OP of the display light L1 by reflecting the display light L1 emitted from the emission unit 2. The first reflection mirror 31 corresponds to an intermediate reflection mirror that reflects the display light L1, which is emitted from the emission unit 2, toward the second reflection mirror 32. The second reflection mirror 32 corresponds to a reflection mirror that finally reflects the display light L1, which has been reflected on the first reflection mirror 31 and crossed in the intersecting direction, toward the windshield WS. That is to say, the first reflection mirror 31 totally reflects the display light L1 emitted from the emission unit 2 toward the second reflection mirror 32, and the second reflection mirror 32 reflects the display light L1 toward the windshield WS. The second reflection mirror 32 totally reflects the display light L1 reflected by the first reflection mirror 31 toward the windshield WS, and the windshield WS reflects the display light L1 toward the eye point EP.

The first reflection mirror 31 and the second reflection mirror 32 each may be what is called a planar mirror, a magnifying mirror, or a free-form mirror. The magnifying mirror is formed as a concave mirror or a convex mirror, and reflects and magnifies the display light L1 so that an image expressed by the display light L1 after the reflection becomes larger than an image expressed by the display light L1 before the reflection. The free-form mirror is, unlike a spherical or paraboloid surface, formed as a mirror whose shape is asymmetric about the optical axis AX and is also referred to as an aspherical mirror. That is to say, the free-form mirror has a concave surface or a convex surface and is formed as a mirror whose shape is asymmetric about the optical axis AX. The free-form mirror is formed to have a shape according to the surface shape of the windshield WS, the geometric positional relation of the optical reflection systems including the first reflection mirror 31, the second reflection mirror 32, and the windshield WS, or the like. The free-form mirror, before reflecting the display light L1, corrects the distortion optically so that the display image VI expressed by the display light L1 finally formed on the windshield WS has a desired shape. Although each of the first reflection mirror 31 and the second reflection mirror 32 is the free-form mirror (aspherical mirror) in this example, the mirror is not limited to the free-form mirror.

The optical system 3 is provided in the housing 4. Here, the first reflection mirror 31 is provided at the position inside the housing 4 and on the rear side in the vehicle front-rear direction X and the upper side in the vehicle height direction Z. On the other hand, the second reflection mirror 32 is provided at the position inside the housing 4 and on the front side in the vehicle front-rear direction X and the upper side in the vehicle height direction Z. The first reflection mirror 31 and the second reflection mirror 32 are disposed inside the housing 4 at the positions where their reflection surfaces face each other along the vehicle front-rear direction X. The first reflection mirror 31 is supported in the housing 4 so that the optical axis direction of the display light (reflection light) L1 to be reflected faces the front side in the vehicle front-rear direction X and a little lower side in the vehicle height direction Z, and reflects the display light L1 to the front side in the vehicle front-rear direction X and a little lower side in the vehicle height direction Z. The second reflection mirror 32 is supported in the housing 4 so that the optical axis direction of the display light (reflection light) L1 to be reflected faces a little rear side in the vehicle front-rear direction X and an approximately upright side in the vehicle height direction Z, and reflects the display light L1 to a little rear side in the vehicle front-rear direction X and the approximately upright side in the vehicle height direction Z.

The first reflection mirror 31 and the second reflection mirror 32 according to the present embodiment form the optical path OP of reflecting the display light L1, which is emitted from the emission unit 2 and crosses in the direction of intersecting with the optical axis direction (direction along optical axis AX), toward the windshield WS as described above. In the vehicle display device 1 according to the present embodiment, a cross point CP of the display light L1 exists in the optical path OP between the first reflection mirror 31 and the second reflection mirror 32, and at this cross point CP, the display light L1 crosses in the direction intersecting with the optical axis direction.

In the vehicle display device 1 according to the present embodiment, before the display light L1 emitted from the emission unit 2 and reflected on the first reflection mirror 31 reaches the second reflection mirror 32, the display light L1 crosses with respect to both the vehicle width direction Y and the vehicle height direction Z. The cross point CP of this display light L1 corresponds to a focal point at which the display light L1 emitted from the emission unit 2 is focused. The position of the cross point CP of the display light L1 is determined in accordance with the optical design of each optical system including the optical system 3. In the vehicle display device 1, for example, the display light L1 is crossed between the first reflection mirror 31 and the second reflection mirror 32 by adjusting the lenses and the like inside the device forming the emission unit 2, and the first reflection mirror 31, and the second reflection mirror 32. In the vehicle display device 1, for example, the display light L1 may be crossed between the first reflection mirror 31 and the second reflection mirror 32 by interposing another optical system such as a lens or a mirror outside the device that forms the emission unit 2.

The housing 4 is to house the emission unit 2, the optical system 3, and the like. The housing 4 is formed of, for example, insulating synthetic resin. The housing 4 is formed to have a hollow box shape by combining a plurality of members, for example, and in this hollow internal space, houses the emission unit 2, the optical system 3, and the like. The housing 4 also houses internally a control circuit board that controls the operation of each part of the vehicle display device 1 and the like.

The housing 4 has an opening part 4a on an upper surface thereof in the vehicle height direction Z. The opening part 4a connects the outside and the inside of the housing 4. The opening part 4a is an optical path opening for leading the display light L1 emitted from the emission unit 2 to the outside of the housing 4. The opening part 4a leads the display light L1 traveling from the inside of the housing 4 to the windshield WS, to the outside of the housing 4. Here, the opening part 4a of the housing 4 faces upward in the vehicle height direction Z, and the opening part 4a is covered with a transparent cover member 4b. The transparent cover member 4b is formed of a light-transmitting member that transmits at least the display light L1 emitted from the emission unit 2. The housing 4 is installed in an instrument panel with the positional relation where the opening part 4a faces the upper side in the vehicle height direction Z.

The vehicle display device 1 with the aforementioned structure projects the display light L1, which is emitted from the emission unit 2 and expresses the information to be displayed, to the second reflection mirror 32 through the first reflection mirror 31 and the cross point CP. In the vehicle display device 1, the display light L1 is reflected on the second reflection mirror 32 toward the windshield WS that forms the display surface. In the vehicle display device 1, the display light L1 that is reflected on the second reflection mirror 32 toward the windshield WS reaches the windshield WS through the opening part 4a and the transparent cover member 4b. In the vehicle display device 1, the display light L1 having reached the windshield WS is reflected by the windshield WS toward the eye point EP. With this structure, the vehicle display device 1 displays the display image VI by the display light L1 on the windshield WS. This display image VI is a reflection image by the display light L1 reflected on the windshield WS toward the eye point EP, and is a so-called virtual image that can be viewed from the eye point EP. In this manner, the vehicle display device 1 can display the display image VI as the virtual image about the vehicle information by the display light L1 on the windshield WS.

Figure 2:
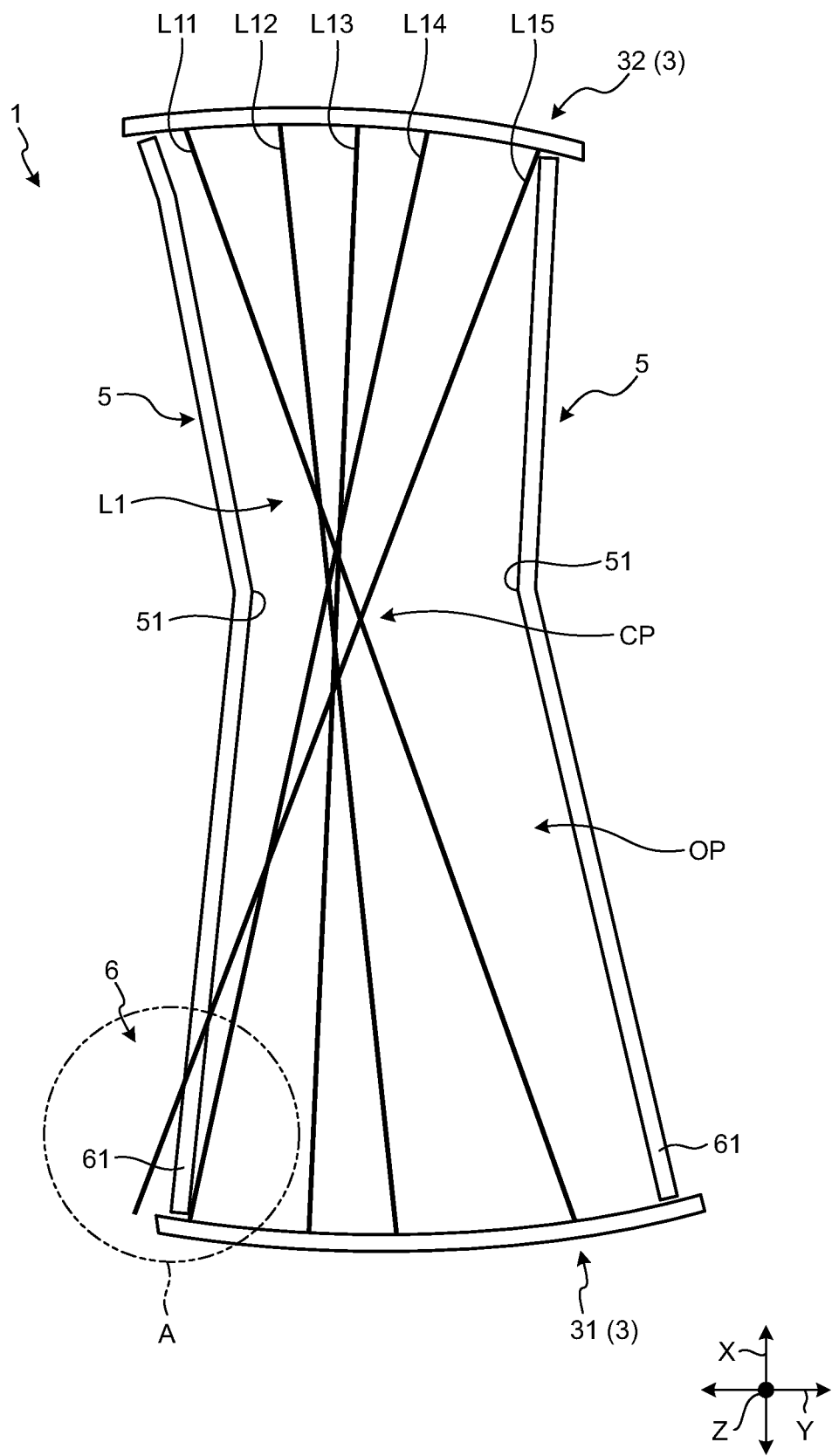
FIG. 2 is a schematic plan view illustrating a schematic structure of an optical system in the vehicle display device according to the first embodiment.

In the vehicle display device 1 according to the present embodiment with such a structure, the cross point CP of the display light L1 is formed in the optical path OP between the first reflection mirror 31 and the second reflection mirror 32 as illustrated in FIG. 2, so that the width of the optical path OP near the cross point CP can be suppressed to be relatively narrow. As a result, the vehicle display device 1 can be reduced in size.

The vehicle display device 1 according to the present embodiment includes light-blocking walls 5 existing to face the optical path OP of the display light L1 between the first reflection mirror 31 and the second reflection mirror 32, and by the provision of narrowing parts 51 in accordance with the cross point CP to the light-blocking walls 5, the entire device can be reduced in size.

The light-blocking wall 5 constitutes a part of an inner case provided inside the housing 4, for example. The light-blocking walls 5 are provided as a pair to face each other with the optical path OP interposed therebetween with respect to the intersecting direction of the display light L1, that is, the vehicle width direction Y in the example in FIG. 2. A pair of light-blocking walls 5 extends along the vehicle front-rear direction X between the first reflection mirror 31 and the second reflection mirror 32 so that each plate thickness direction is along the vehicle width direction Y. Each end part of each light-blocking wall 5 in the vehicle front-rear direction X is disposed close to the first reflection mirror 31 and the second reflection mirror 32. A pair of light-blocking walls 5 is disposed to face the optical path OP between the first reflection mirror 31 and the second reflection mirror 32. In the vehicle display device 1, between a pair of light-blocking walls 5 with respect to the vehicle width direction Y, the optical path OP exists and the cross point CP of the display light L1 in the optical path OP also exists.

Each light-blocking wall 5 includes the narrowing part 51 that narrows the optical path OP toward the cross point CP of the display light L1 along the intersecting direction of the display light L1, that is, the vehicle width direction Y in the example in FIG. 2.

The narrowing part 51 is a part of the light-blocking wall 5 that is formed so as to protrude to the cross point CP along the vehicle width direction Y. The narrowing part 51 is formed at an approximately central part of the light-blocking wall 5 in the vehicle front-rear direction X. The narrowing part 51 has a narrowing shape so that the distance between a pair of narrowing parts 51 along the vehicle width direction Y becomes gradually smaller in a manner that the light-blocking wall 5 gets close to the cross point CP gradually along the vehicle width direction Y from an end part side to a central part side in the vehicle front-rear direction X. With this structure, the narrowing parts 51 of the light-blocking walls 5 narrow the optical path OP toward the cross point CP along the vehicle width direction Y in the vehicle display device 1.

Although the first reflection mirror 31, the second reflection mirror 32, and a pair of light-blocking walls 5 have the asymmetric shape horizontally with respect to the vehicle width direction Y in accordance with the environment where the vehicle display device 1 is installed in the vehicle V, for example, the shape is not limited to this shape and may be a symmetric shape horizontally.

In the example in FIG. 2, the light-blocking walls 5 are provided as a pair facing each other along the vehicle width direction Y in the intersecting direction of the display light L1; however, another pair of light-blocking walls is provided to face each other similarly with respect to the vehicle height direction Z in the intersecting direction of the display light L1.

In the description made below, the partial cutoff adjustment structure 6 is described with reference to an example of the partial cutoff of the display image VI in the case where the eye point EP moves along the vehicle width direction Y in the intersecting direction of the display light L1. The partial cutoff of the display image VI in the case where the eye point EP moves along the vehicle height direction Z in the intersecting direction of the display light L1 is substantially the same as that with respect to the vehicle width direction Y; therefore, the description here is minimized.

Here, at the cross point CP of the display light L1, the light rays of the display light L1 (for example, light rays L11 to L15 illustrated in FIG. 2) do not cross at one point strictly, and in fact, the light rays intersect within a predetermined range near the cross point CP due to the influence of aberration, tolerance, or the like of the optical system 3 or the windshield WS that forms the display surface. In the vehicle display device 1, the light rays of the display light L1 tend to deviate from the cross point CP near the cross point CP, and for example, the light ray on the central side in the display light L1 tends to deviate outward from the cross point CP easily. Because of this, the display image VI may be cut off partially at an unintended position in the vehicle display device 1.

In this regard, the vehicle display device 1 according to the present embodiment includes the partial cutoff adjustment structures 6 in addition to the narrowing parts 51; thus, the disturbance of the partial cutoff of the display image VI due to the disturbance of the light rays of the display light L1 near the cross point CP as described above is suppressed.

Specifically, the partial cutoff adjustment structure 6 according to the present embodiment partially cuts off the display image VI by the display light L1 in a portion other than the narrowing part 51 when the eye point EP moves along the vehicle width direction Y (intersecting direction).

The amount of protrusion (in other words, narrowing amount) of the narrowing parts 51 in the present embodiment toward the cross point CP along the vehicle width direction Y (intersecting direction) is defined in accordance with the aberration, the tolerance, or the like allowed in the optical system 3 or the like. In addition, the narrowing parts 51 are formed with the protrusion amount that does not cause the partial cutoff of the display image VI at the narrowing parts 51 against the maximum disturbance of the light rays that can occur near the cross point CP. The amount of protrusion of the narrowing parts 51 toward the cross point CP is set in accordance with the optical design of the optical system 3, the windshield WS that forms the display surface, and the like, a viewing point assurance region of the eye point EP determined based on the eye box EB or the like, the geometric positional relation thereof, and the like, through the pilot experiment, the simulation, and the like.

In view of this, the partial cutoff adjustment structure 6 according to the present embodiment includes a partial cutoff wall part 61 provided to the light-blocking wall 5 as the structure of partially cutting off the display image VI by the display light L1 at a portion other than the narrowing part 51 when the eye point EP moves along the vehicle width direction Y (intersecting direction).

Here, the partial cutoff wall part 61 is formed by a part of the light-blocking wall 5 that is closer to the first reflection mirror 31 than to the narrowing part 51, more specifically, formed by an end part of the light-blocking wall 5 that is close to the first reflection mirror 31. The portion where the partial cutoff wall part 61 is provided at the light-blocking wall 5 is set in accordance with the optical design of the optical system 3, the windshield WS that forms the display surface, and the like, the viewing point assurance region of the eye point EP determined based on the eye box EB or the like, the geometric positional relation thereof, and the like, through the pilot experiment, the simulation, and the like.

Figure 3:
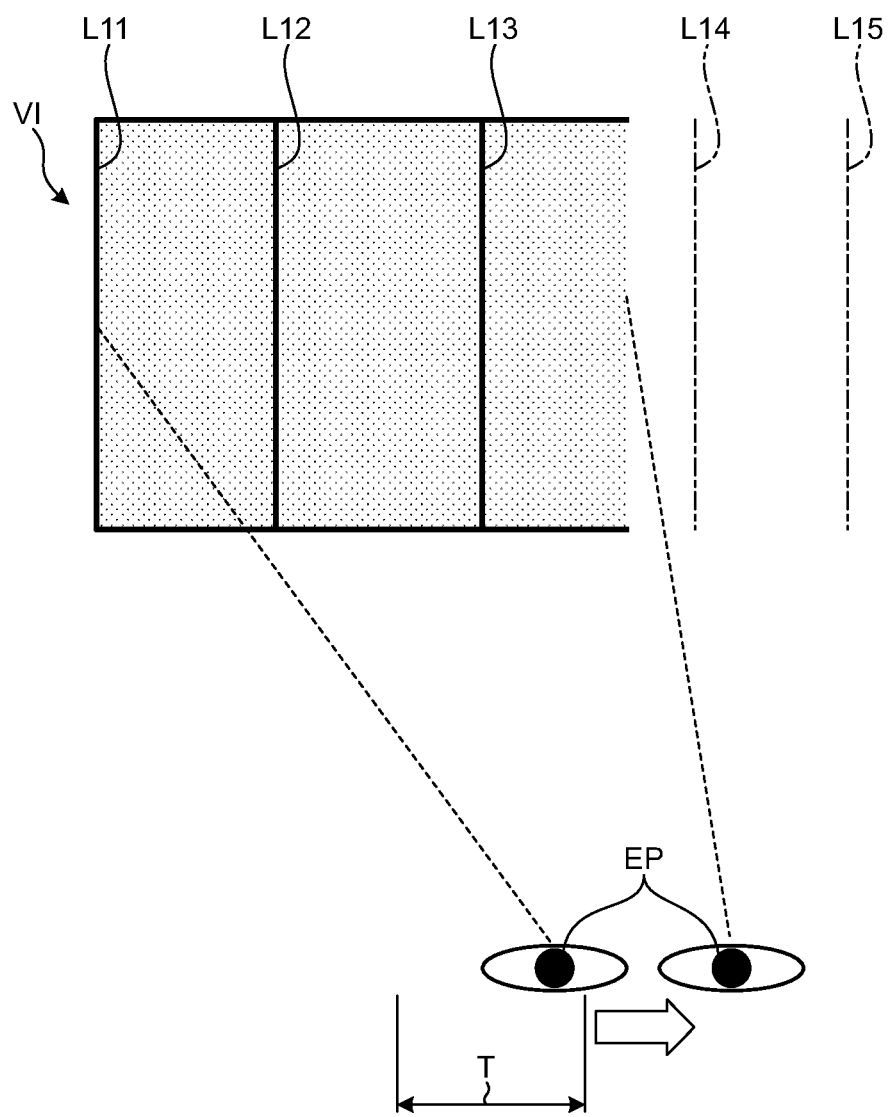
FIG. 3 is a schematic view for describing the partial cutoff of a display image in the vehicle display device according to the first embodiment.

In the vehicle display device 1, as illustrated in FIG. 2 and FIG. 3, the display image VI starts to be partially cut off as the eye point EP moves to the right in FIG. 3 along the vehicle width direction Y (intersecting direction) and goes away from a viewing point assurance region T that is determined based on the eye box EB or the like. In this case, for example as indicated by a surrounding line A in FIG. 2, the display light L1 starts to be blocked by the partial cutoff wall part 61 or the like in the order from the light ray L15 on the end side of the display light L1 in the vehicle width direction Y. As a result, the cutoff line of the display image VI viewed at the eye point EP moves from the right to the left, in the order from the light ray L15 side to a light ray L14, a light ray L13, a light ray L12, and a light ray L11 as illustrated in FIG. 3.

Figure 4:
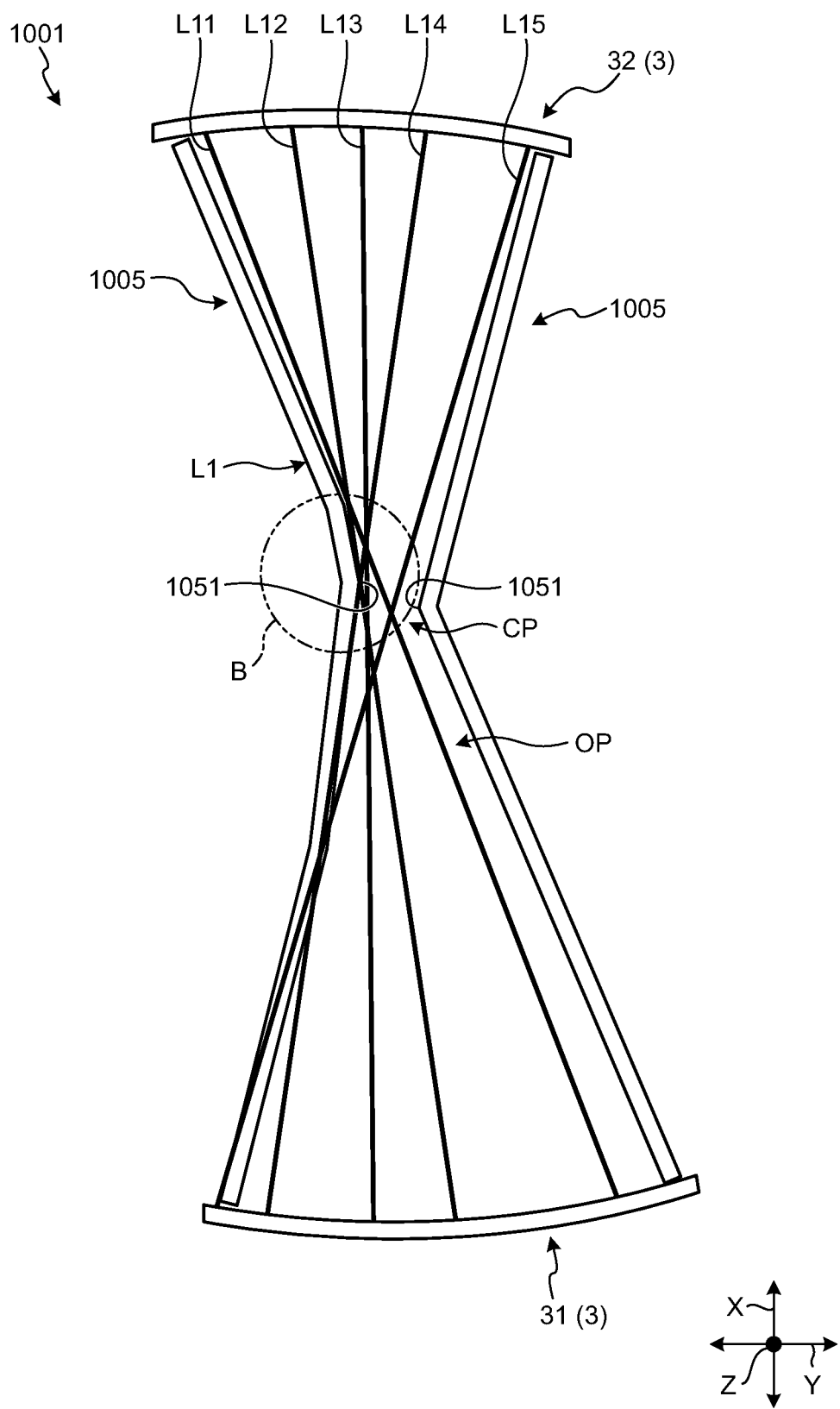
FIG. 4 is a schematic plan view illustrating a schematic structure of an optical system in a vehicle display device according to a comparative example.
Figure 5:
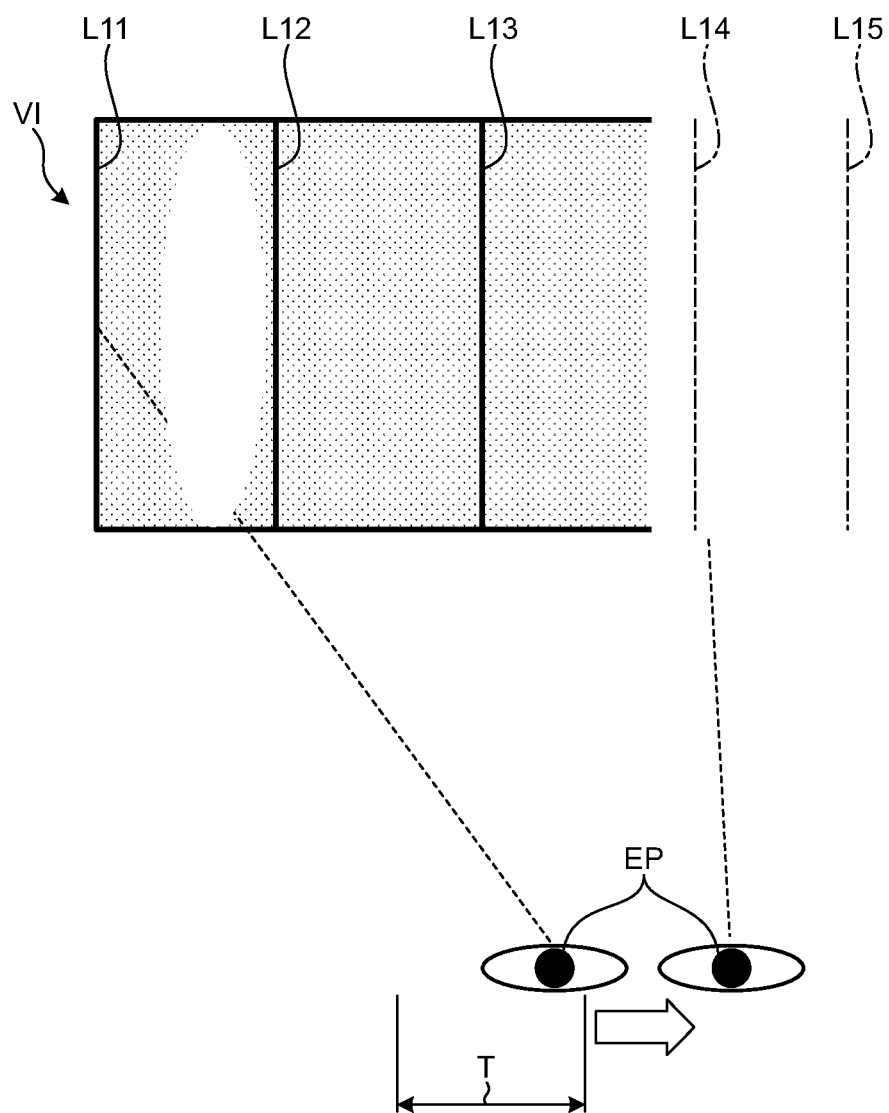
FIG. 5 is a schematic view for describing the partial cutoff of the display image in the vehicle display device according to the comparative example.

FIG. 4 and FIG. 5 illustrate a vehicle display device 1001 according to a comparative example. The vehicle display device 1001 is different from the vehicle display device 1 according to the present embodiment in that the amount of protrusion (narrowing amount) of a narrowing part 1051 is larger than that of the narrowing part 51, and the aforementioned partial cutoff adjustment structure 6 is not provided.

In the vehicle display device 1001, as illustrated in FIG. 4 and FIG. 5, the display image VI starts to be partially cut off as the eye point EP moves to the right in FIG. 5 along the vehicle width direction Y (intersecting direction) and goes away from the viewing point assurance region T that is determined based on the eye box EB or the like. In this case, the display light L1 is blocked by a light-blocking wall 1005 or the like starting from the light ray L15 existing at an end side of the display light L1 in the vehicle width direction Y; for example, as indicated by a surrounding line B in FIG. 4, the light rays L12 and L11 are blocked in the middle before the light ray L13 by the narrowing part 1051. As a result, the cutoff line of the display image VI viewed at the eye point EP is moved from the light ray L15 side to the light ray L14, and then skipped to the light rays L12 and L11 side and at last, the light ray L13 is cut off; therefore, the partial cutoff of the display image VI is disturbed at the unintended position.

Meanwhile, the vehicle display device 1 according to the present embodiment includes the partial cutoff adjustment structures 6; therefore, before the narrowing parts 51 partially cut off the display image VI, the partial cutoff wall parts 61 in the partial cutoff adjustment structures 6 can partially cut off the display image VI as described above. As a result, the vehicle display device 1 according to the present embodiment can suppress the occurrence of the partial cutoff of the display image VI at the narrowing parts 51, and the partial cutoff of the display image VI when the eye point EP moves along the vehicle width direction Y (intersecting direction) can be performed from one end side to the other end side without causing a sense of discomfort. In other words, the partial cutoff wall part 61 is provided at the portion where the occurrence of the partial cutoff of the display image VI at the narrowing part 51 on the light-blocking wall 5 can be suppressed and the partial cutoff of the display image VI when the eye point EP moves along the vehicle width direction Y (intersecting direction) can be performed without causing a sense of discomfort in the order from one end side to the other end side in the intersecting direction.

Note that in the vehicle display device 1, by the provision of the partial cutoff adjustment structure that is approximately similar to the aforementioned partial cutoff adjustment structure 6 also in the vehicle height direction Z in the intersecting direction of the display light L1, the occurrence of the disturbance of the partial cutoff of the display image VI with respect to the vehicle height direction Z can be suppressed.

The vehicle display device 1 described above can perform display by the display light L1 on the windshield WS in a manner that the optical system 3 makes the display light L1 emitted from the emission unit 2 cross in the intersecting direction intersecting with the optical axis direction (vehicle width direction Y, vehicle height direction Z) and then the display light L1 is reflected on the windshield WS toward the eye point EP. In this case, the size of the vehicle display device 1 can be reduced because the narrowing parts 51 of the light-blocking walls 5 positioning to face the optical path OP of the display light L1 narrow the optical path OP toward the cross point CP of the display light L1 along the intersecting direction.

In the vehicle display device 1 with this structure, when the eye point EP moves along the intersecting direction, the partial cutoff adjustment structure 6 can partially cut off the display image VI by the display light L1 before the narrowing part 51 narrowed to the cross point CP partially cuts off the display image VI. With this structure, the display image VI can be partially cut off at the intended suitable position in the vehicle display device 1. That is to say, by crossing the display light L1, the size of the vehicle display device 1 can be reduced and moreover, the disturbance of the partial cutoff of the display image VI can be suppressed by the partial cutoff adjustment structure 6, and the contradiction that occurs due to the crossing of the display light L1 can be solved. As a result, the vehicle display device 1 can perform suitable display.

Here, the vehicle display device 1 is formed including the partial cutoff wall parts 61 in which the partial cutoff adjustment structures 6 are provided to the light-blocking walls 5. In this case, before the narrowing part 51 partially cuts off the display image VI, the partial cutoff wall part 61 in the partial cutoff adjustment structure 6 can partially cut off the display image VI in the vehicle display device 1. As a result, the partial cutoff wall part 61 using a part of the light-blocking wall 5 can achieve the partial cutoff adjustment structure 6 in the vehicle display device 1; therefore, the suitable display can be performed while the increase in number of components is suppressed, for example, the increase in manufacturing cost is suppressed.

Second Embodiment

A vehicle display device according to a second embodiment is different from the vehicle display device according to the first embodiment in the structure of the partial cutoff adjustment structure. In the description below, the components similar to those in the aforementioned embodiment are denoted by the common reference symbols, and the redundant description of the common structure, operation, and effect is minimized (this similarly applies to the description below).

Figure 6:
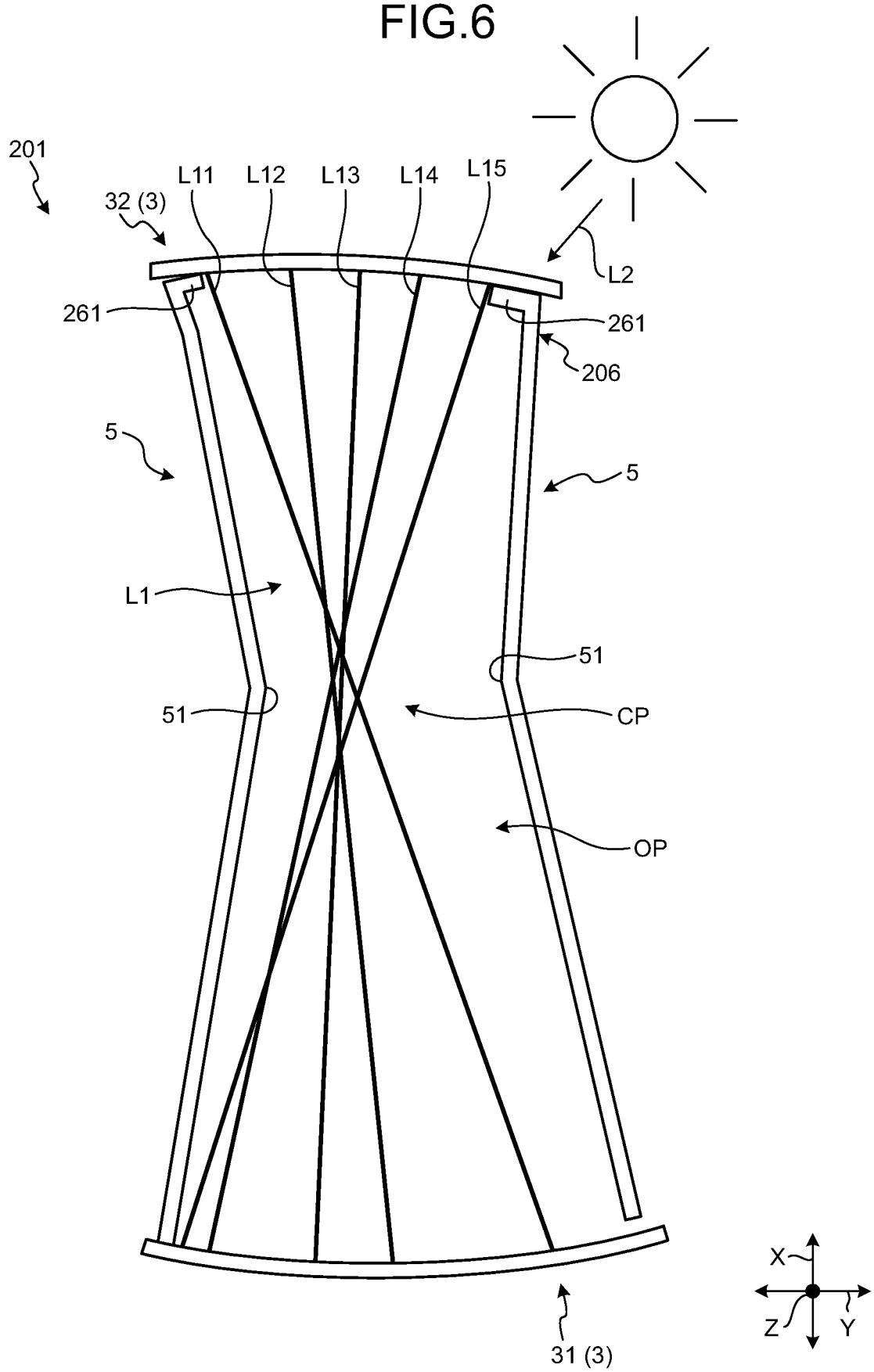
FIG. 6 is a schematic plan view illustrating a schematic structure of an optical system in a vehicle display device according to a second embodiment.

A vehicle display device 201 according to this embodiment illustrated in FIG. 6 is different from the vehicle display device 1 described above in that the vehicle display device 201 includes a partial cutoff adjustment structure 206 instead of the partial cutoff adjustment structure 6. The structure of the other components of the vehicle display device 201 is approximately similar to that of the aforementioned vehicle display device 1.

The partial cutoff adjustment structure 206 according to the present embodiment is different from the aforementioned partial cutoff adjustment structure 6 in that the partial cutoff adjustment structure 206 is provided to the first reflection mirror 31 or the second reflection mirror 32 as the reflection mirror. The structure of the other components of the partial cutoff adjustment structure 206 is approximately similar to that of the aforementioned partial cutoff adjustment structure 6.

The partial cutoff adjustment structure 206 according to the present embodiment is formed including a partial cutoff wall part 261 provided to one of the first reflection mirror 31 and the second reflection mirror 32. The partial cutoff wall part 261 functions as a structure that partially cuts off the display image VI by the display light L1 at a portion other than the narrowing part 51 when the eye point EP moves along the vehicle width direction Y (intersecting direction). The partial cutoff wall part 261 according to the present embodiment is provided to the second reflection mirror 32 that finally reflects the display light L1, which is emitted from the emission unit 2 and crosses in the vehicle width direction Y (intersecting direction), toward the windshield WS. That is to say, the partial cutoff adjustment structure 206 according to the present embodiment is formed including the partial cutoff wall part 261 provided to the second reflection mirror 32.

Here, the partial cutoff wall part 261 is provided to each of both end parts, in the vehicle width direction Y (intersecting direction), of the reflection surface of the second reflection mirror 32 (surface facing the first reflection mirror 31 along the vehicle front-rear direction X). The partial cutoff wall part 261 is provided as the wall body whose plate thickness corresponds to the vehicle front-rear direction X, and extends along the vehicle height direction Z. A part of the reflection surface of the second reflection mirror 32 where the partial cutoff wall part 261 is provided is set in accordance with the optical design of the optical system 3, the windshield WS that forms the display surface, and the like, the viewing point assurance region of the eye point EP determined based on the eye box EB or the like, the geometric positional relation thereof, and the like, through the pilot experiment, the simulation, and the like. Here, the partial cutoff wall part 261 is unified continuing to the light-blocking wall 5; however, the structure is not limited thereto and the partial cutoff wall part 261 may be formed separately from the light-blocking wall 5.

In this case, by the provision of the partial cutoff adjustment structure 206 in the vehicle display device 201 in a manner similar to the vehicle display device 1, when the eye point EP moves along the vehicle width direction Y (intersecting direction), the partial cutoff wall part 261 of the partial cutoff adjustment structure 206 can partially cut off the display image VI before the narrowing part 51 partially cuts off the display image VI. As a result, the vehicle display device 201 according to the present embodiment can suppress the occurrence of the partial cutoff of the display image VI at the narrowing part 51, and the partial cutoff of the display image VI when the eye point EP moves along the vehicle width direction Y (intersecting direction) can be performed from one end side to the other end side without causing a sense of discomfort. In other words, the partial cutoff wall part 261 is provided at the portion where the occurrence of the partial cutoff of the display image VI at the narrowing part 51 on the reflection surface of the second reflection mirror 32 can be suppressed, and the partial cutoff of the display image VI when the eye point EP moves along the vehicle width direction Y (intersecting direction) can be performed without causing a sense of discomfort in the order from one end side to the other end side in the intersecting direction.

The vehicle display device 201 described above can perform the suitable display in a manner similar to the vehicle display device 1.

Here, in the vehicle display device 201, the partial cutoff adjustment structure 206 is formed including the partial cutoff wall part 261 provided to the second reflection mirror 32. In this case, in the vehicle display device 1, the partial cutoff wall part 261 of the partial cutoff adjustment structure 206 can partially cut off the display image VI before the narrowing part 51 partially cuts off the display image VI. As a result, the vehicle display device 201 can achieve the partial cutoff adjustment structure 6 by the partial cutoff wall part 261 provided to the second reflection mirror 32.

In this case, in the vehicle display device 201, the partial cutoff wall part 261 of the partial cutoff adjustment structure 206 is provided to the second reflection mirror 32 that finally reflects the display light L1, which is emitted from the emission unit 2 and crosses in the intersection direction, toward the windshield WS. That is to say, the partial cutoff wall part 261 is provided in the optical path OP on the opening part 4a side (see FIG. 1) relative to the cross point CP. In the vehicle display device 201 with this structure, as illustrated in FIG. 6, the partial cutoff wall part 261 provided to the second reflection mirror 32 can block a part of external light L2 having entered the second reflection mirror 32 through the opening part 4a from the outside the housing 4. As a result, in the vehicle display device 201, a region of the second reflection mirror 32 to reflect the external light L2 can be made relatively small; thus, the concentrated energy by the external light L2 in the housing 4 can be reduced. Accordingly, in the vehicle display device 201 that performs the suitable display as described above, the concentrated energy by the external light L2 can be reduced and the temperature increase of the housing 4 can be suppressed, and moreover, the thermal deterioration can be suppressed.

Third Embodiment

A vehicle display device according to a third embodiment is different from the vehicle display device according to the second embodiment in a structure of the partial cutoff adjustment structure.

Figure 7:
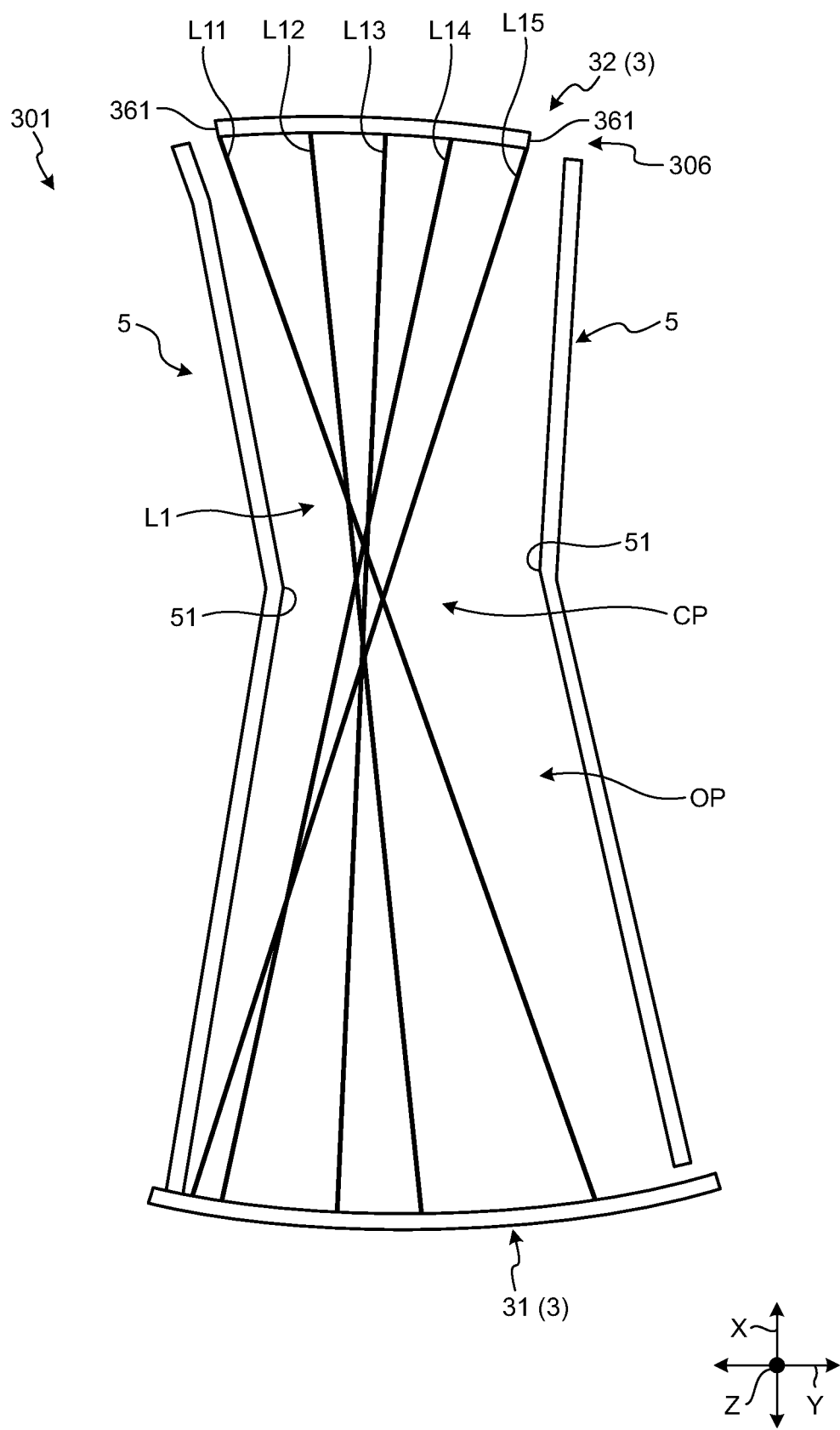
FIG. 7 is a schematic plan view illustrating a schematic structure of an optical system in a vehicle display device according to a third embodiment.

A vehicle display device 301 according to the present embodiment illustrated in FIG. 7 is different from the vehicle display device 201 in that the vehicle display device 301 includes a partial cutoff adjustment structure 306 instead of the partial cutoff adjustment structure 206. The structure of the other components of the vehicle display device 301 is approximately similar to that of the vehicle display device 201 described above.

The partial cutoff adjustment structure 306 according to the present embodiment is different from the partial cutoff adjustment structure 206 in that the partial cutoff adjustment structure 306 is provided to the second reflection mirror 32. The structure of the other components of the partial cutoff adjustment structure 306 is approximately similar to that of the partial cutoff adjustment structure 206 described above.

The partial cutoff adjustment structure 306 according to the present embodiment is formed including a partial cutoff end 361 provided to one of the first reflection mirror 31 and the second reflection mirror 32. The partial cutoff end 361 functions as a structure that partially cuts off the display image VI by the display light L1 at a portion other than the narrowing part 51 when the eye point EP moves along the vehicle width direction Y (intersecting direction). The partial cutoff end 361 according to the present embodiment is provided to the second reflection mirror 32 that finally reflects the display light L1, which is emitted from the emission unit 2 and crosses in the vehicle width direction Y (intersecting direction), toward the windshield WS. That is to say, the partial cutoff adjustment structure 306 according to the present embodiment is formed including the partial cutoff end 361 provided to the second reflection mirror 32.

Here, the partial cutoff end 361 is provided to each of both end parts, in the vehicle width direction Y (intersecting direction), of the reflection surface of the second reflection mirror 32 (surface facing the first reflection mirror 31 along the vehicle front-rear direction X). More specifically, the partial cutoff end 361 is an end of the reflection surface of the second reflection mirror 32 in the vehicle width direction Y (intersecting direction). A part of the reflection surface of the second reflection mirror 32 where the partial cutoff end 361 is provided is set in accordance with the optical design of the optical system 3, the windshield WS that forms the display surface, and the like, the viewing point assurance region of the eye point EP determined based on the eye box EB or the like, the geometric positional relation thereof, and the like, through the pilot experiment, the simulation, and the like.

In this case, by the provision of the partial cutoff adjustment structure 306 in the vehicle display device 301 in a manner similar to the vehicle display device 201, when the eye point EP moves along the vehicle width direction Y (intersecting direction), the partial cutoff end 361 of the partial cutoff adjustment structure 306 can partially cut off the display image VI before the narrowing part 51 partially cuts off the display image VI. As a result, the vehicle display device 301 according to the present embodiment can suppress the occurrence of the partial cutoff of the display image VI at the narrowing part 51, and the partial cutoff of the display image VI when the eye point EP moves along the vehicle width direction Y (intersecting direction) can be performed from one end side to the other end side without causing a sense of discomfort. In other words, the partial cutoff end 361 is provided at the position where the occurrence of the partial cutoff of the display image VI at the narrowing part 51 on the reflection surface of the second reflection mirror 32 can be suppressed, and the partial cutoff of the display image VI when the eye point EP moves along the vehicle width direction Y (intersecting direction) can be performed without causing a sense of discomfort in the order from one end side to the other end side in the intersecting direction.

The vehicle display device 301 described above can perform the suitable display in a manner similar to the vehicle display device 201.

Here, in the vehicle display device 301, the partial cutoff adjustment structure 306 is formed including the partial cutoff end 361 corresponding to the end of the second reflection mirror 32 in the intersecting direction. In this case, in the vehicle display device 301, the partial cutoff end 361 of the partial cutoff adjustment structure 306 can partially cut off the display image VI before the narrowing part 51 partially cuts off the display image VI. As a result, the partial cutoff end 361 using a part of the second reflection mirror 32 can achieve the partial cutoff adjustment structure 306 in the vehicle display device 301; therefore, for example, the suitable display can be performed while the increase in number of components is suppressed, for example, the increase in manufacturing cost is suppressed.

In this case, in the vehicle display device 301, the partial cutoff end 361 of the partial cutoff adjustment structure 306 is provided to the second reflection mirror 32 that finally reflects the display light L1, which is emitted from the emission unit 2 and crosses in the intersecting direction, toward the windshield WS. Accordingly, in the vehicle display device 301 that performs the suitable display in a manner similar to the vehicle display device 201, the concentrated energy by the external light L2 can be reduced and the temperature increase of the housing 4 can be suppressed, and moreover, the thermal deterioration can be suppressed.

Note that the vehicle display devices according to the embodiments of the present invention described above are not limited to the aforementioned embodiments and various changes are possible within the range described in the scope of claims.

In the above description, the display light L1 crosses in both the vehicle width direction Y and the vehicle height direction Z as the intersecting direction intersecting with the optical axis direction in the vehicle display devices 1, 201, and 301; however, the display light L1 may cross in just one direction.

In the above description, the display surface that reflects the display light L1 toward the eye point EP is the windshield WS; however, the display surface is not limited to the windshield WS and may be a combiner or the like provided separately from the windshield WS, for example.

In the above description, the partial cutoff wall part 261 is provided to the second reflection mirror 32 that is the final reflection mirror; however, the partial cutoff wall part 261 may be provided to the first reflection mirror 31 that is the intermediate reflection mirror. Similarly, the partial cutoff end 361 may be provided to the first reflection mirror 31 that is the intermediate reflection mirror.

In the above description, the optical system 3 includes the first reflection mirror 31 and the second reflection mirror 32; however, the optical system 3 may include one free-form mirror, for example.

The vehicle display device according to the present embodiment may be formed by combining the components in the embodiments and modifications as appropriate.

The vehicle display device according to the present embodiment can perform the display by the display light on the display surface in a manner that the optical system makes the display light emitted from the emission unit cross in the intersecting direction intersecting with the optical axis direction and then the display light is reflected on the display surface toward the eye point. In this case, the size of the vehicle display device can be reduced because the narrowing part of the light-blocking wall provided to face the optical path of the display light narrows the optical path of the display light along the intersecting direction toward the cross point. In such a structure, when the eye point moves along the intersecting direction, the partial cutoff adjustment structure of the vehicle display device can partially cut off the display image before the narrowing part that is narrowed to the cross point partially cuts off the display light. By this structure, the vehicle display device can partially cut off the display image at the intended suitable position. As a result, the vehicle display device can perform the suitable display, which is advantageous.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
   an emission unit that is mounted on a vehicle and emits display light;
   an optical system that makes the display light emitted from the emission unit cross along an intersecting direction intersecting with an optical axis direction of the display light, and then reflects the display light on a display surface provided to the vehicle toward an eye point that is assumed in advance;
   a light-blocking wall provided to face an optical path of the display light and including a narrowing part that narrows the optical path toward a cross point of the display light along the intersecting direction; and
   a partial cutoff adjustment structure that partially cuts off a display image by the display light at a portion other than the narrowing part when the eye point moves along a vehicle width direction.

2. The vehicle display device according to claim 1, wherein
   the partial cutoff adjustment structure includes a partial cutoff wall part provided to the light-blocking wall.

3. The vehicle display device according to claim 1, wherein
   the optical system includes a reflection mirror that reflects the display light emitted from the emission unit, and
   the partial cutoff adjustment structure includes a partial cutoff wall part provided to the reflection mirror.

4. The vehicle display device according to claim 3, wherein the reflection mirror finally reflects the display light that is emitted from the emission unit and crosses in the intersecting direction toward the display device.

5. The vehicle display device according to claim 1, wherein
   the optical system includes a reflection mirror that reflects the display light emitted from the emission unit, and
   the partial cutoff adjustment structure includes a partial cutoff end that is an end of the reflection mirror in the intersecting direction.

6. The vehicle display device according to claim 5, wherein the reflection mirror finally reflects the display light that is emitted from the emission unit and crosses in the intersecting direction toward the display device.

7. The vehicle display device according to claim 1, wherein the optical system includes a first reflection mirror that reflects the display light emitted from the emission unit and a second reflection mirror that reflects the display light emitted from the emission unit,
   wherein the second reflection mirror finally reflects the display light that is emitted from the emission unit and crosses in the intersecting direction toward the display device, and
   wherein the partial cutoff adjustment structure is provided to the second reflection mirror.

8. The vehicle display device according to claim 1, wherein the partial cutoff adjustment structure includes a partial cutoff wall part.

9. The vehicle display device according to claim 1, wherein the partial cutoff adjustment structure includes a partial cutoff end.

10. A vehicle display device comprising:
    a housing;
    an emission unit housed in the housing and configured to emit a display light;
    an optical system comprising a first reflection mirror, a second reflection mirror, light blocking walls and a partial cutoff adjustment structure;
    wherein the vehicle display device is configured to project a display image by the display light on a windshield of a vehicle;
    wherein the first reflection mirror and the second reflection mirror are configured to reflect the display light;
    wherein the light blocking walls comprise a narrowing part configured to narrow an optical path of the display light;
    wherein the partial cutoff adjustment structure is configured to partially cut off the display image when an eye point moves along a width direction of the vehicle.

11. The vehicle display device of claim 10, wherein the display light is configured to be reflected by the first reflection mirror before being reflected by the second reflection mirror.

12. The vehicle display device of claim 11, wherein the partial cutoff adjustment structure is associated with the second reflection mirror.

13. The vehicle display device of claim 12, wherein the partial cutoff adjustment structure includes a partial cutoff wall part.

14. The vehicle display device of claim 12, wherein the partial cutoff adjustment structure includes a partial cutoff end.

15. The vehicle display device of claim 10, wherein the partial cutoff adjustment structure includes a partial cutoff wall part.

16. The vehicle display device of claim 10, wherein the partial cutoff adjustment structure includes a partial cutoff end.

* * * * *